Jan. 16, 1962　　　M. C. DAILEY　　　3,017,305
BUILDING BOARD
Filed Aug. 23, 1956

INVENTOR.
Manvel C. Dailey
BY
James E. Toomey
Attorney

3,017,305
BUILDING BOARD
Manvel C. Dailey, Palo Alto, Calif., assignor to Kaiser Gypsum Company, Inc., Oakland, Calif., a corporation of Washington
Filed Aug. 23, 1956, Ser. No. 605,718
6 Claims. (Cl. 156—40)

This invention relates to a process for the production of plaster board, and more particularly, it relates to the production of plaster board having improved strength and hardness of the edges thereof.

In commonly employed production methods, gypsum board is produced by continuously forming a slurry containing calcined gypsum ($CaSO_4 \cdot \frac{1}{2}H_2O$), water, and additives for control of setting time, weight, and bond, between two plies or liners of paper. Normally, the lower paper ply is supported by a flat rubber belt, which carries the paper beneath a continuous mixer. The mixer discharges the prepared slurry in proper quantity onto the paper to produce a board of desired width and thickness. Edges of the bottom paper sheet are folded upwardly and over to enclose the slurry and provide a paper enclosed edge for the finished board. A second, top sheet of paper, having width equal to the width of the finished board, is superimposed over the gypsum slurry and upfolded edge of the bottom paper sheet. The board assembly is passed between two cylindrical master rolls, so spaced as to define desired board thickness. The formed board is carried by flat rubber belts and roll conveyors to a cut-off knife, set to cut individual boards to desired length. Setting time of the gypsum slurry is so adjusted that the gypsum "core" is set or hydrated before the board reaches the cut-off knife. At that point the board has developed enough strength and hardness to permit cutting and handling. The damp boards from the cut-off knife are dried by passage through a multiple deck, tunnel-type drier for removal of free water from the set core.

The board which has been formed as described, by deposition of aqueous slurry between liners and setting or hardening, still contains a substantial amount of free water and must be dried, as stated above. For instance, gypsum core board of one-half inch thickness contains from 900 to 1100 lbs. of water per 1000 sq. ft. of board, and this water must be removed during the drying operation. The driers which are in general use in this art are heated by steam coils, direct-fired flue gases admixed with air, or by a combination of these two means. In the drying operation, hot gases are distributed as evenly as possible over each part, for example, each deck, of the drier to obtain uniformity of drying; and various means, for instance, adjustable baffles, or other means, are employed to control gas circulation in such driers and to provide the desired uniform distribution of hot gases. It is also necessary to carefully control drier temperatures, particularly during the final stages of drying near the discharge end of the drier; especially because set or hydrated gypsum, $CaSO_4 \cdot 2H_2O$, of which the board core essentially consists, is subject to calcination at moderate temperatures, as follows:

$$CaSO_4 \cdot 2H_2O + heat \rightarrow CaSO_4 \cdot \frac{1}{2}H_2O + 1\frac{1}{2}H_2O$$

Dehydration of set gypsum core is accompanied by a great reduction in strength and hardness of the core and of the board produced. If dehydration occurs during the heating and drying step, the core becomes soft and chalky; and the bond between the liner or paper cover sheets and the core becomes so weakened that the paper may be easily pulled from the core of the finished board. The board itself, if dehydration has taken place to any substantial amount, is weak, brittle and of unsatisfactory quality for practical use. In practice, drying is so controlled that the central portion of the core is undehydrated and remains strong, but unavoidably the edge portions are frequently dehydrated under normal drying conditions and the edges exhibit the above disadvantages.

It is desirable, in normal production of gypsum core boards, to carry out the drying step at as high temperature as possible in order to speed drying and achieve maximum production rates without causing core calcination. Ordinarily, board driers constitute production bottle necks which limit the rate of production of a plant.

One of the principal problems in drier operation lies in the proper control of drying conditions, such as temperature, rate of drier gas circulation and humidity, to obtain uniform drying of the sheet, or board, across its full width from edge to edge. Due to greater exposed surface at the edges, the edges dry more rapidly than the main body or central portion of the board. Core temperature close to or adjacent the edge often increases to where calcination can occur at that point while the main body or central portion of the core still contains free water and is therefore at a lower temperature and is well below the point at which calcination of the gypsum will occur. It is therefore a disadvantage of present processes of operation that in the board produced, the center portion is properly dried and is not dehydrated, but the edges are soft, chalky and dehydrated. Generally, depth of the dehydrated core edge is shallow, not exceeding one-fourth to one-half inch, but even this slight amount of calcination detracts substantially from product quality. Board with calcined edges is subject to edge damage from rough handling, is difficult to nail without shattering of the core, and paper edges can be easily peeled from the underneath soft core. Because of this situation, it becomes necessary to operate board driers at lower temperatures and slower production rates than would be otherwise required if board edges were not more susceptible to "burning" than the main body of the board.

It is an object of the present invention to provide a method for preventing edge calcination of gypsum core boards. It is a further object of the invention to provide a method for increasing the strength and hardness of edges of gypsum core board. It is a still further object of the invention to enable more rapid drying of the central portion of gypsum core board while preventing calcination at the edges of such board. Other objects and advantages of the invention will be apparent from the description below.

According to the present invention, the above disadvantages are overcome, and calcination of the gypsum core board edges is prevented or substantially reduced and the strength and hardness of the board edges are increased by incorporating at the surface of the edge portions of the calcined gypsum slurry during forming of such board an organic moisture- or water-retaining or dehydration-preventing substance or agent. Such an agent is an organic calcination inhibitor, or there can be employed as such agent an organic humectant. The agent employed is adapted to prevent or retard removal of water present either as water of crystallization in the gypsum molecule or as free water or moisture. More specific examples of the agents to be added will be given below. A humectant is a water-soluble organic substance which reduces rate or evaporation of a water solution containing it, the rate of evaporation decreasing progressively as the concentration of humectant increases during evaporation.

The calcination inhibitor, which is employed, when admixed with rehydrated gypsum, $CaSO_4 \cdot 2H_2O$, has the effect of increasing the critical dehydration temperature of the gypsum or of reducing its rate of calcination under any given temperature conditions. There is used as calcination inhibitor a water-soluble, hydroxy, aliphatic, organic compound such as, for example, a sugar or dimethylol urea. The organic calcination inhibitors useful herein do not have a deleterious effect upon the characteristics or behavior of the gypsum and after removal of the free water do not leave in the gypsum core any substance having a deleterious effect. The sugars which are useful herein include monosaccharoses such as glucose, fructose, galactose, for example; or di or tri-saccharose such as, for example, sucrose, lactose, maltose. Dextrose or corn sugar gives particularly good results. Other organic compounds which are calcination inhibitors for gypsum, and which are known to the art, can be employed in this invention. Mixtures of calcination inhibitors are useful herein.

The humectant material useful in this invention is an organic hydrophilic, water-soluble material such as glycerol, ethylene glycol, or a gum such as gum arabic or gum tragacanth, or sorbitol, or other organic material of the characteristics defined. Mixtures of humectants can be employed. The humectant material is useful alone in carrying out the process of this invention; or the calcination inhibitor can be used alone; or a calcination inhibitor and humectant can both be employed. Preferably, a calcination inhibitor is employed.

The dehydration-preventing substance is preferably incorporated at the interface between the paper liner and the calcined gypsum slurry, suitably by impregnating the inner surface of the lower or bottom paper liner therewith as described above. The paper liners ordinarily employed in making gypsum core board or lath are composed of more than one ply of paper of which the outer ply is highly sized, while the inner ply which lies against the gypsum core is absorbent, especially water-absorbent. Suitably, a solution of the substance or mixture of substances is brushed, sprayed or rolled onto the outer edges of the bottom sheet just ahead of the slurry mixer discharge station, or the point where the slurry is deposited upon the liner, the bottom liner or sheet traveling on the flat belt conveyor in the known way. It has been found that such addition of the dehydration-preventing substance to the paper liner provides the advantageous results of the present invention; and it is believed that the substance is taken up from the paper liner by the water slurry, and is dispersed in the surface of the calcined gypsum slurry. In an alternative mode of operation, a portion of the treating agent can be sprayed onto the top of the slurry just before the top liner is applied.

The substance, or substances, employed is advantageously added in the process in an amount of from one ounce to five pounds per thousand square feet of board produced, calculated on a board four feet in width, and being applied along the edges of the board in a longitudinal strip of from one to twelve inches in width. The treating material is applied over substantially the whole area of the strip along the edges, as defined. The substance is preferably added in an amount of from 2 to 16 ounces per 1000 square feet of such board, along such edge strips. The substance is preferably applied in water solution, although any other desired solvent for the substance can be employed. For instance, glycerol and dextrose are soluble in ethyl alcohol, and the latter can be employed, if desired, in incorporating these substances according to this invention. The substance can be applied to the entire width of the bottom liner, but, preferably, it is applied to the outer edge of the inner ply or surface of the bottom liner. Advantageously, the substance is incorporated at each edge of the inner surface along a longitudinal strip which is from one inch to twelve inches in width and which is located adjacent the outer edge of the liner but not necessarily beginning immediately at the outer edge thereof.

It is also advantageous to incorporate in the treating solution or at the surfaces of the edge of the slurry mix, a small amount of a substance such as fungicide to prevent the growth of mold or fungus on board edges treated according to the invention. For example, sodium pentachlorphenate or sodium orthophenylphenate can be added. Only a small amount of such substance is added, for example, from 1% to 5% based on the amount of dehydration-preventing substance. There is also added at the board edges any other desired substance or ingredient, such as starch, to improve the bond of core-to-paper at the edges, or a water-soluble resin such as urea-formaldehyde or melamine-formaldehyde resin, for example, to improve toughness of the core adjacent the edges and to increase the wet strength of the board paper edges. One or more of such substances can be added.

The invention is further illustrated by the accompanying drawings, wherein

Figure 1:
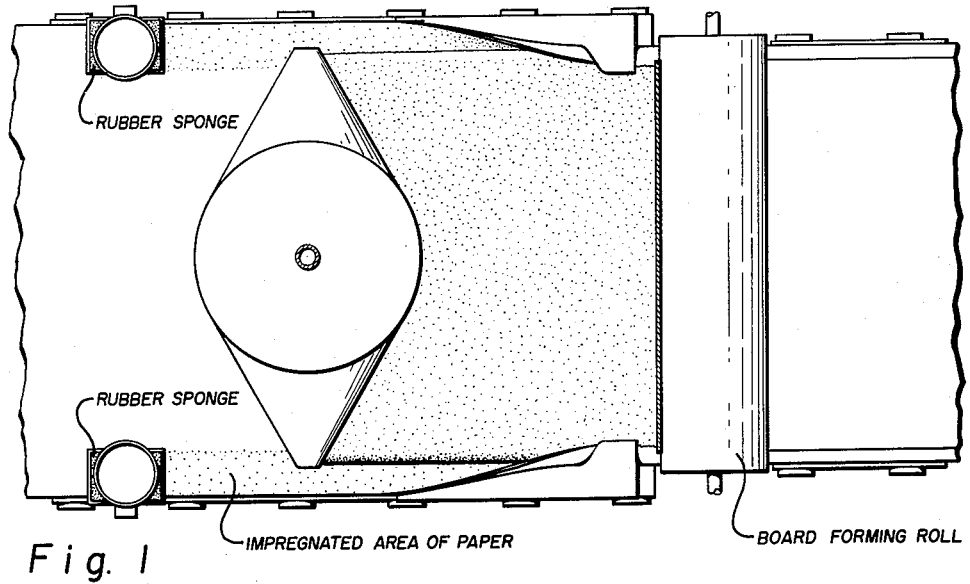
FIGURE 1 is a schematic plan view of one mode of carrying out the process of the present invention.
Figure 2:
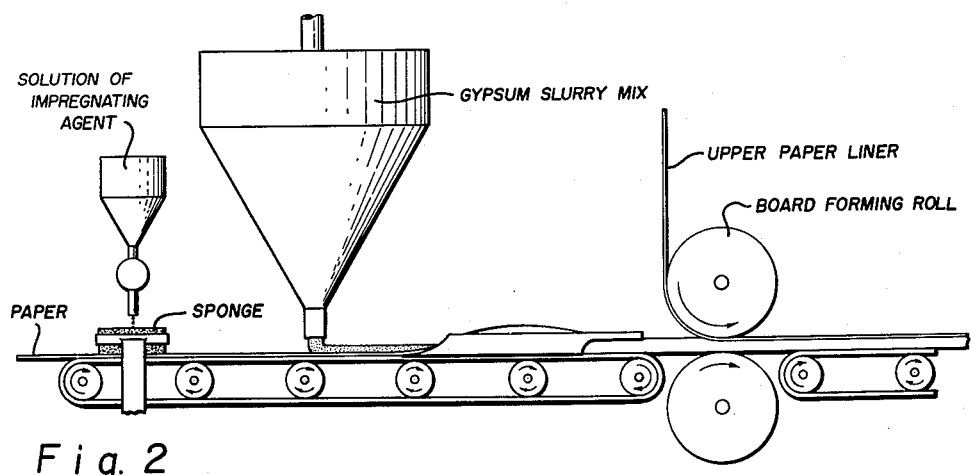
FIGURE 2 is a schematic elevation view of the mode of operation as in FIGURE 1.
Figure 3:
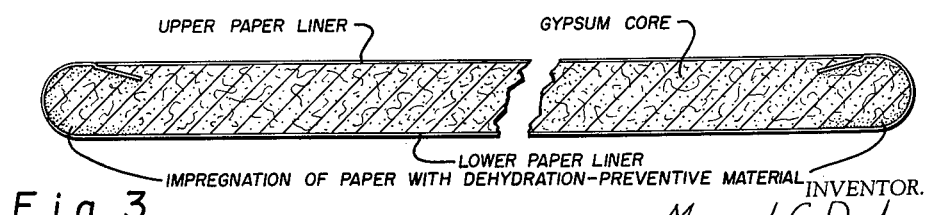
FIGURE 3 illustrates a formed board immediately after forming, wherein the edges of the bottom paper liner are impregnated with the dehydration-preventing agent and the agent is applied in contact with the surface of the gypsum core material, according to the invention.

The mode of operation of the figures illustrates specifically the example of operation described below in Example 1.

It is an advantage of the present invention that gypsum core board can be dried satisfactorily in existing plant equipment, while at the same time the edges of the board exhibit increased strength and hardness. It is a specific advantage of the invention that calcination of the board edges during the drying step is substantially inhibited or prevented. It is a further advantage of the invention that the bond between the gypsum core and the paper liner remains strong in the finished board. It is a great advantage of the present invention that board of more uniform quality is produced because the process prevents edge calcination likely to occur through local high temperature areas frequently occurring in plant driers. It is an important advantage of the process that the temperatures of the drying step can be increased and production rate therefore increased without subjecting the board to edge calcination. It is an advantage of the present invention that the added substance is concentrated at the drying surface where its beneficial effects are obtained at minimum cost and with use of minimum amount of additive. It is a further advantage that the added substance has no deleterious effect on the core mix itself.

The following examples will illustrate more clearly the mode of carrying out the present invention.

EXAMPLE 1

A plastic slurry of calcined gypsum is made up in the manner well known in this art by mixing calcined gypsum, $CaSO_4 \cdot \frac{1}{2}H_2O$, with water and, as desired, small amounts of the usual additives such as starch, paper fibers, other fibers, set controlling agents, foam, etc. A lower paper liner is moved forward on a flat belt conveyor, passing beneath the slurry mixer, and slurry is deposited on the liner to provide the gypsum core. Adjacent each edge of the paper liner, a rubber sponge having a horizontal surface area of about six inches by four inches rides on the upper surface of the liner just ahead of the slurry discharge. A treating solution is prepared by dissolving 20 lbs. corn sugar (dextrose) in 100 lbs. water, to which is also added 0.1 lb. sodium pentachlorphenate. The solution is continuously dripped or slowly flowed onto the sponge which transfers it to the surface of the paper over a strip four inches in width. The treated paper passes forwardly under the slurry discharge, or the point where the slurry is deposited thereon, and after slurry has been deposited, the edges of the paper liner are folded upwardly and over to enclosed the slurry at the edges and to provide a paper-enclosed edge for the finished board. This folding step and means for carrying it out are well known in this art. The board now passes under the board-forming master rolls, and the top liner is applied; and the board is hardened, cut and dried all in the known way.

The solution is added at a rate to provide 4.5 ounces of dextrose per thousand square feet of finished board, the board being in this example four feet wide. The drier temperatures are maintained at about 330° F. at the zone where the wet board enters and at about 175° to 250° F. at the exit zone.

In another run, a further portion of calcined gypsum slurry as prepared for the above test is made up into board, hardened and dried in exactly the same way, except that the paper edges are not treated and no dextrose or sodium pentachlorphenate is incorporated. Finished boards from this run and from the above run are tested for edge hardness by use of a spring weighted, needle-type impressor gauge, calibrated to measure depth of penetration of a standard needle under constant loading. The depth of penetration of the needle into the core edge provides a quantitative comparative measure of core hardness and serves as a fast, accurate and convenient measure of the extent or degree of core calcination. An example of a series of penetrations found with a core which has been properly dried and is uncalcined, as contrasted with a core which has been dried to the extent that it is completely calcined, when tested by the gauge described, is as follows:

| Core | Needle penetration in inches | |
| --- | --- | --- |
| | Range | Average |
| 1. Normal, no dehydration | 0.115 to 0.135 | 0.125 |
| 2. Completely dehydrated | 0.255 to 0.275 | 0.265 |

It can be seen from the above that the penetrations in the case of the dehydrated core run about twice that of the core which has not been dehydrated.

In the production runs made as described in this example, the core edges are tested in the above manner, and the following results are obtained:

| Board | Needle penetration at edges in inches | |
| --- | --- | --- |
| | Range | Average of 50 tests |
| Dextrose-treated | 0.130-0.180 | 0.147 |
| Untreated | 0.150-0.225 | 0.178 |

The above tests clearly show that the edge hardness of board treated with this small amount of dextrose is substantially increased. The board made according to this example exhibits uniform increase in edge hardness throughout a great number of plant-scale runs. Furthermore, the bond of the paper liner to the core at the edge remained very good, and nailability is excellent.

EXAMPLE 2

Another portion of plastic calcined gypsum water slurry is made up, and board is formed in exactly the same manner as in Example 1 except that in this test the treating solution applied through the sponge is prepared by dissolving 15 lbs. of sucrose and 20 lbs. of glycerol in 65 lbs. of water. Board made according to this example exhibits edge hardness equal to that of Example 1.

The following table shows other examples of aqueous treating solutions which are applied as described herein, that is, to the edge strips of the liner or liners or at the interface between the liner or liners and the slurry.

Table

| Solution | Treating agent | Amount of water as solvent, lbs. |
| --- | --- | --- |
| 1 | Sorbitol, 10 lbs | 100 |
| 2 | Dimethylol urea, 10 lbs., and gum tragacanth, 1 lb. | 100 |
| 3 | Dextrose, 10 lbs., and gum arabic, 5 lbs | 100 |
| 4 | Sucrose, 20 lbs | 100 |

Board edges treated with the above solutions and by the process described herein exhibit substantially increased strength and hardness, and excellent nailability.

While the above examples illustrate the most convenient method of incorporating the dehydration-preventing substance, any other desired method of incorporation can be employed. The plastic, aqueous gypsum slurry is made up in the manner well known in the art and can contain other ingredients, such as expanded or unexpanded perlite or vermiculite, glass fibers, etc. In another method of carrying out this invention, the treating agents can be applied to the top edge of the slurry, preferably at a point just prior to placing thereon the top paper or fibrous liner, and the agents can be so applied by spraying, brushing or in any other desired manner. The paper or fibrous liner in one embodiment is treated or impregnated with the treating agent before it is installed for use in the gypsum board-making operation. In still another embodiment, the dry treating agent in powdered form is suitably placed, as by dusting or sprinkling, on the surface of the liner just prior to deposition of the slurry; and the water of the deposited slurry then takes up the dry agent and disperses it substantially at the interface between the paper liner and the gypsum core. In a preferred embodiment, the treating agent or agents are added as a water solution to the liner edge strip in an amount of from 3 to 15 grams, or from 0.10 to 0.5 ounce, of a 10% to 30% solution per square foot of treated liner surface. The preferred ranges of amounts given herein refer to addition of one of the substances used or to the total amount of additives where more than one of the substances is employed.

It is believed that the dehydration-preventing substance has the effect of inhibiting calcination or of increasing resistance of gypsum to dehydration upon heating, or of retarding or reducing the rate of water evaporation from board edges, or of both effects during the drying operation as carried out in the present process. By "dehydrating-preventing substance" is meant the calcination inhibitor, or the humectant or hygroscopic agent, or both, as described above. The term "gypsum board" is intended to include board, lath and sheathing or any similar type of gypsum product which is paper-covered or covered with a fibrous liner or sheet, and which is subjected to heating to dryness, that is, until free water in the core is substantially entirely removed, and the core is set and consists essentially of a set mass of interlaced gypsum crystals.

Having now decribed the invention, what is claimed is:

1. Process for making a gypsum core board having increased edge strength and hardness and having an upper and a lower paper liner which comprises first impregnating the inner surface of said lower liner in a strip extending from one inch to twelve inches inwardly from each edge of said liner with a water solution containing 15 pounds of sucrose and 20 pounds of glycerol and 65 pounds of water in an amount to provide from two to sixteen ounces of total of both substances per thousand square feet of board, thereafter depositing a plastic slurry of calcined gypsum upon said lower liner, folding the edges of said linear over the edges of said gypsum slurry, placing said upper paper liner upon said slurry and forming said board and heating to dry.

2. Process for inhibiting edge calcination of a plaster board having a gypsum core and an upper and a lower fibrous liner which comprises first flowing a water solution of at least one substance chosen from the group consisting of organic inhibitors of gypsum calcination and organic humectants onto the edge portions of the inner surface of said lower liner on a moving board-forming line, thereafter depositing calcined gypsum slurry on said lower liner on said line, folding said edge portions over said deposited slurry to bring said treated inner surface into contact with said slurry and to provide a paper-enclosed edge for the board, placing said upper liner on said deposited slurry on said lower liner, and hardening and drying said board.

3. Process as in claim 2 wherein said water solution is a water solution of dextrose.

4. Process for increasing the edge strength of a gypsum core board having an upper and a lower paper liner which comprises first impregnating the inner face of said lower liner in a strip extending inwardly from each outer edge to a distance of from one to twelve inches with at least one dehydration-preventing substance chosen from the group consisting of organic inhibitors of gypsum calcination and organic humectants, thereafter depositing a plastic slurry of calcined gypsum upon said liner, folding the edges of said liner over said plastic slurry and in contact therewith, placing said upper liner upon said deposited slurry, and forming and drying said board.

5. Process as in claim 4 wherein said lower liner face is impregnated with from 0.1 to 0.5 ounce per square foot of said treated surface of a 10% to 30% water solution of said dehydration-preventing surface.

6. Process as in claim 4 wherein said inner face strip is impregnated with a 20% water solution of dextrose to provide from 2 to 16 ounces dextrose per thousand square feet of board.

References Cited in the file of this patent

UNITED STATES PATENTS

| | | |
|---|---|---|
| 1,489,693 | Brookby | Apr. 8, 1924 |
| 1,790,252 | Speer | Jan. 27, 1931 |
| 1,937,967 | King et al. | Dec. 5, 1933 |
| 2,078,199 | King | Apr. 20, 1937 |
| 2,089,087 | Fletcher | Aug. 3, 1937 |
| 2,152,670 | Shutt | Apr. 4, 1939 |
| 2,203,589 | Baymiller | June 4, 1940 |
| 2,344,600 | Codwise | Mar. 21, 1944 |
| 2,402,331 | Kvalnes | June 18, 1946 |
| 2,762,738 | Teale | Sept. 11, 1956 |